INVENTORS
ALTON G. BALE JR.
WILLIAM H. MOORE
BY
Andrus & Starke
Attorneys

United States Patent Office 3,493,062
Patented Feb. 3, 1970

3,493,062
ELECTRICALLY CONTROLLED MATERIAL DELIVERY SYSTEM
Alton G. Bale, Jr., Greendale, and William H. Moore, Milwaukee, Wis., assignors to Wisconsin Electrical Mfg. Co., Inc., Milwaukee, Wis., a corporation of Wisconsin
Filed Feb. 1, 1966, Ser. No. 524,003
Int. Cl. G01g 19/22
U.S. Cl. 177—70   11 Claims

ABSTRACT OF THE DISCLOSURE

This disclosure relates to a concrete batching system having a scale signal source and a card coded preset signal source. Each signal source includes a suitable transformer energized from a batch size transformer. Separate over and under tolerance check transformer windings are provided having a presettable output. A sequencing control first connects the signals from the scale and preset signal sources into a balance detecting amplifier. The tolerance checking signals are connected by contacts in series with the present signal source and varies the balance condition in a predetermined manner to detect whether the delivered material is within a predetermined tolerance.

---

Figures 1, 2:
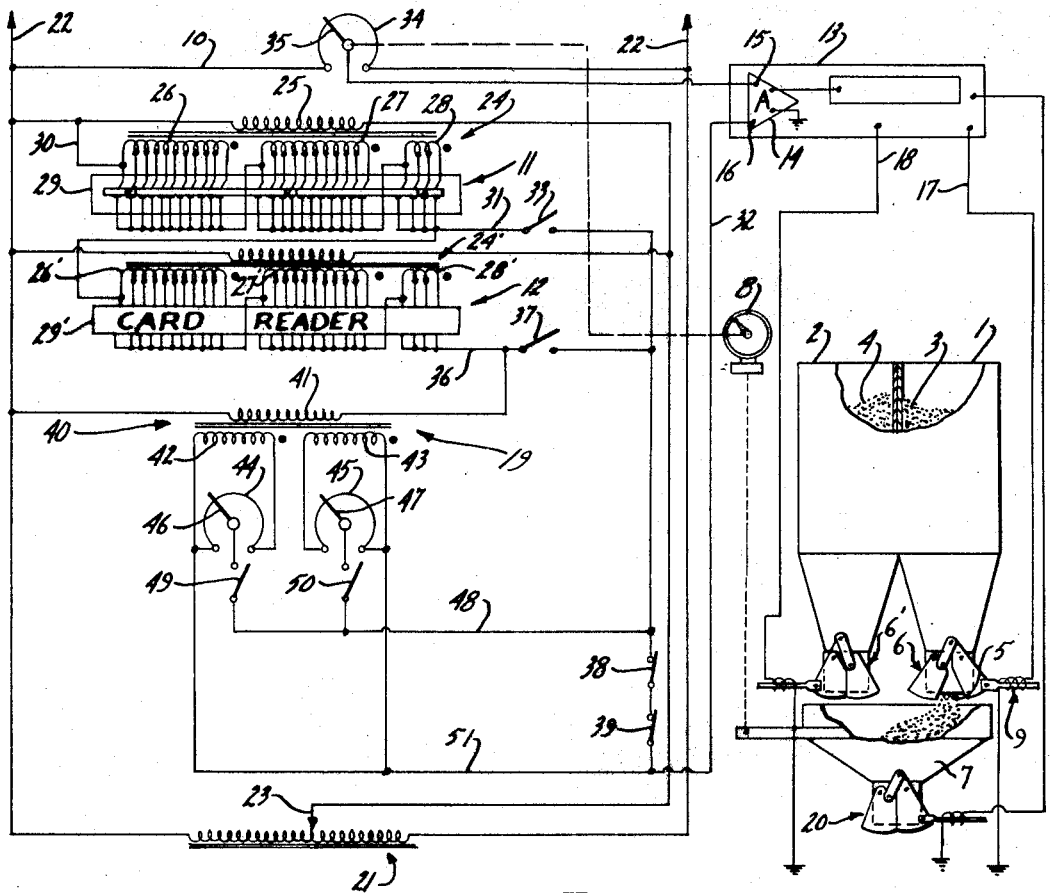

This invention relates to an electrically controlled material delivery system particularly adapted for concrete and similar batch processes wherein the several ingredients are fed from central storage units to suitable weighing means for combining into predetermined quantities for each batch.

In many batch processes, the system preferably includes a tolerance control means such that if the batch or the quantities of the several ingredients do not fall within predetermined tolerances adjustment can be made. In road building and similar government projects very close specifications are provided establishing the quantity of each material and the tolerance permitted and the importance of tolerance control is substantial. A highly satisfactory system is shown in applicant's U.S. Patent 2,954,202 wherein an electrical balance system is employed to accurately deliver material to a batch receiver and special means are provided to offset an electrical balance to establish a tolerance check which will insure that the final weight of delivery is within predetermined tolerances. The system disclosed therein has been found to provide a highly reliable and accurate means for controlling batch processes and the like.

The present invention is particularly directed to certain improvements for providing over and under tolerance check for particular control systems particularly where an alternating current batch-size transformer and preset transformer circuits are employed for controlling the delivery of the material and the like; for example, as shown in the copending application of Alton G. Bale, Jr. entitled Batching Control System which was filed on Mar. 22, 1965 with Ser. No. 441,461.

Generally, in accordance with the present invention, the batch system includes a balance detecting network having a scale signal source and preset signal source connected to a signal comparison circuit means to provide automatic signals controlling the feed of material to a weighing receiver. The tolerance signal source, in accordance with this invention, is isolated from the output signals of the scale signal source and the input signal source and includes an output circuit which is selectively connected in circuit with the comparison circuit means. The isolation may be provided externally or internally of the comparison circuit means. Where external isolation is employed, the tolerance source output circuit is connected in series with the output of the scale signal source or the preset signal source.

In one novel construction, each signal source includes a suitable transformer energized from a common source and preferably a batch size transformer. Separate over and under tolerance check transformer windings are provided having a presettable output. Sequencing means are provided for sequentially inserting the signals into the balance detecting network. The tolerance checking signals vary the balance condition in a predetermined manner to provide control if the output does not fall within a predetermined tolerance.

The over and under tolerance check circuit may include separate secondary windings forming a part of the main winding of a material delivery transformer or may include a completely separate transformer or transformers. The under and over tolerance units are energized by a signal in phase or 180° out of phase with the material selection or preset transformer. Generally, the main circuit includes two sets of normally closed contacts, one of which relates to the under tolerance check and the opposite of which relates to the over tolerance check. The over and under tolerance units are connected in parallel with the contacts and include further contacts to selectively and separately insert the over tolerance check signal and the under tolerance check signal. In the material feed condition, the contacts remove the tolerance control signals from the circuit and directly insert the preset and the scale signals in the balance network. When it is desired to provide a tolerance check the appropriate contacts in the main line are opened and appropriate contacts in a tolerance transformer circuit are closed to insert the appropriate tolerance signal into the balance circuit and thereby provide an adjustment of corresponding output signals which determines whether or not the batch is within or out of tolerance.

The system may be established to proportion the overweight and underweight tolerance percentage in accordance with the batch size only or in accordance with the batch size and the preset material quantity.

The drawings furnished herewith illustrate the above advantages and features as well as others which will be clear from the following description.

In the drawings:

FIG. 1 is a schematic circuit diagram of a batching system constructed in accordance with the present invention and in which the control provides a means for proportioning over and under tolerances with batch size as well as with material quantity; and FIG. 2 is a schematic diagram similar to FIG. 1 showing material delivery for a single material and a means for checking of tolerance by batch size only.

Referring to the drawings and particularly to FIG. 1, a typical application of the invention is shown in an automatic control and delivery of preselected weights of stone and sand in preparation for use in concrete at either a permanent site or in the instance of highway paving from temporary installations established near the point of use. The illustrated concrete batching system is shown with a single pair of bins 1 and 2 respectively containing stone 3 and sand 4 for simplicity of explanation. Each of the bins 1 and 2 and associated apparatus is similarly constructed and controlled and consequently, the bin 1 is described and the corresponding elements of bin 2 identified by similar primed numbers.

The bin 1 includes a lower gravity discharge opening 5 normally held closed through a jaw type gate 6. A weighing hopper 7 is suitably mounted immediately below both of the discharge openings 5 and 5′ and coupled to a suitable scale 8 to record the cumulative weight of material fed to the hopper 7 from bins 1 and 2. An electromagnetic actuator 9 is shown connected to the jaw type gate 6 to selectively open and close the opening 5. The actuator 9 is controlled from a control circuit including a material weight responsive branch or section 10 which produces alternating current output signals proportional to the scale reading, a preset stone section 11 which produces corresponding alternating current output signals in accordance with the weight of the stone to be delivered from bin 1 and a preset sand section 12 which produces corresponding alternating current output signals in accordance with the weight of the sand to be taken from bin 2. The output signals of sections 10–12 are fed to a control unit 13 having a signal comparison circuit means such as an amplifier 14 which produces an output signal in accordance with the relative signal levels at a pair of input terminals 15 and 16. The control unit 13 includes a first output line 17 connected to actuate solenoid 9 and a second output line 17' connected to actuate solenoid actuator 9'. A sequencing switch unit, not shown, forms a part of unit 13 to provide sequential operative connection of the lines as well as sequencing switches or contacts in the control circuit, as hereinafter described. For example, unit 13 may include a stepping unit controlling relays for operating the several contacts as more fully described and shown in U.S. Patent 3,125,176. As such detail may take many forms and can be readily supplied by those skilled in the art particularly from the above patent, the detail is not shown herein to avoid undue complexity of the illustration and description.

In the illustrated embodiment of the invention, an over and under tolerance check section 19 is provided and adapted to provide voltage signals selectively connected in circuit to the amplifier 14 in series with the preset signal established by sections 11 and 12 for controlling the operation of discharge gate 20 from the receiving hopper 7 and particularly to prevent normal discharge of batches which do not meet predetermined tolerance specifications. In operation, the control unit 13 sequentially inserts the outputs of sections 11 and 12 into circuit with the scale section 10 and consequently sequentially provides for delivery of material from bins 1 and 2 to the receiving hopper 7. After delivery, over and under tolerance check signals from section 19 are connected in series with the total signal from sections 11 and 12 to electrically check whether the batch is within the required tolerances.

In the illustrated embodiment of the invention, the material preset sections 11 and 12 are constructed in accordance with the teaching of the previously identified application and are similarly energized from a batch size selection transformer 21 which is connected to suitable alternating current power lines 22. The batch size selection transformer 21 is shown as an autotransformer having a tapped winding connected to the power lines 22 and a movable tap 23. The tap 23 is connected to the several sections as presently described to provide a corresponding percentage energization in accordance with the batch size. The scale branch 10 is energized directly from the power lines 22. If 50% of a full batch is required, the tap 23 is correspondingly set and the scale branch 10 will provide the necessary balance when only 50% of the material is delivered as a result of the direct full voltage energization.

The sand and stone sections 11 and 12 are more fully described in the previously identified copending application and are briefly described herein to the extent necessary to fully explain the present invention. Further, section 11 is described with the corresponding elements of the section 12 identified by similar primed numbers.

The preset stone section 11 includes a transformer 24 having a primary winding 25 connected between the tap 23 and a common power line 22. The primary winding 25 is therefore energized in accordance with the percentage setting of the batch size transformer 21. The secondary of the transformer 24 is shown as including three different windings which are identified respectively as a units winding 26, a tens winding 27 and a hundreds winding 28 such that the weight of material to be delivered is identified in accordance with a decimal identification system. The windings 26–28 are provided with a plurality of taps and connected in circuit through punch card code reader 29 or the like. The reader 29 serially connects preselected voltages from the windings 26–28 in series between a common lead 30 connected to the common line 22 and an output lead 31. The voltage selected is the electrical equivalent of the material proportion in the particular batch.

The output line 31 is connected to the amplifier preset line 32 and includes a set of normally open contacts 33 actuated by the sequencing means of control unit 13. The contacts 33 are closed to insert the stone preset transformer secondary output in the circuit of the control unit 13 which provides an output to the stone bin gate solenoid 9. The gate 6 opens and material is delivered to the associated weighing hopper 7. The scale reflects the increasing weight and actuates a scale potentiometer 34 in the branch 10.

Potentiometer 34 is connected to leads 22 and includes a tap 35 coupled to the scale 8. Tap 35 is connected to terminal 15 as the second input to amplifier 14. The tap 35 moves to an increasing weight position as the material is delivered to hopper 7 and when the proper amount is delivered balances and the input circuit to the amplifier 14 and the material feed is cut off.

In accordance with the usual practice, a dribble type feed system can be inserted as well as other compensating circuitry if desired; that not being shown for simplicity of illustration.

The sand preset branch 12 generally corresponds to the stone preset branch 11 with the signal from the secondary windings 26'–28' summated through the card reader 29' and inserted between lead 31 and a stone output lead 36 which is connected to line 32 through a set of normally open sequence contacts 37 which, upon termination of the stone feed, are automatically closed by the sequencing means of control unit 13 at the same time contacts 33 are opened. Consequently, the total signal applied to the control lead 32 and therefore to the amplifier is the sum of the voltages of the stone preset section 11 and the sand preset section 12. The signal of the preset lead 32 is greater than that of the scale potentiometer. The unbalance actuates the control unit 13 and particularly gate 6' to deliver sand 3 to the receiving hopper 7. As the sand is delivered to the hopper 7, the scale potentiometer is driven to note the increasing weight and until a new electrical balance condition is obtained.

The input lead 32 to the amplifier 14 further includes two sets of normally closed contacts 38 and 39 connected in series and actuated to insert the over and under tolerance weight section 19 into the circuit.

The over and under tolerance section 19 includes a transformer 40 having a primary winding 41 connected across the secondaries or outputs of the sand and stone preset transformers 24 and 24'. The transformer 40 includes an underweight tolerance secondary winding 42 and an overweight tolerance secondary winding 43 similarly connected to energize a pair of related potentiometers 44 and 45.

Windings 42 and 43 are wound to have similar polarities with respect to the secondary windings 26–28 as shown by the instantaneous positive polarity dot symbols adjacent the right ends of the windings in the drawings.

Potentiometers 44 and 45 include suitable taps 46 and 47 respectively connected to a common lead 48. Under tolerance contacts 49 are connected between tap 46 and lead 48 and over tolerance contacts 50 are similarly connected between tap 47 and lead 48. The opposite ends of the potentiometers 44 and 45 are similarly connected to a second common line 51.

The common lines 48 and 51 are connected to the opposite side of the normally closed contacts 38 and 39. In operation, after the material delivery has terminated, the sequencing control operates to open contacts 38 and close contacts 49. This inserts the tolerance voltage signal related to the setting of potentiometer tap 46 and also related to the batch size and the material quantity as a result of the energization through the output of sections 11 and 12 which in turn are energized from the batch size transformer 21. The voltage from the potentiometer 44 is 180° out of phase with the signal of sections 11 and 12 and the preset signal to amplifier 14 is decreased accordingly by an electrical equivalent of the negative weight deviation specified as the lower tolerance limit. If the weight of the material for any reason is below such tolerance, the input to the amplifier 14 is unbalanced with the lesser signal from the scale potentiometer 34 to the amplifier 14 providing a sensible output signal. A suitable responsive control may be inserted in circuit by the sequencing means to prevent further operation of the system illuminating a lamp or the like such as disclosed in the previously identified U.S. Patent 2,954,202.

If the system is within the tolerance limit, the sequencing means moves to an overweight tolerance check position at which time the underweight tolerance contacts 38 and 49 revert to the normally closed and normally open position respectively and the overweight tolerance contacts 39 and 50 are actuated to the open and closed positions, respectively. This inserts the potentiometer 45 into the circuit. The overweight tolerance potentiometer 45 is connected in the circuit to insert a signal which is in phase with the preset signal from sections 11 and 12 because the positive or high potential terminal is shown connected to line 51 at the assumed instantaneous polarities. Consequently, when the contacts 50 close, the voltage appearing across the high side of the potentiometer 45 is inserted in series with the signal from sections 11 and 12 and an increased potential applied to the amplifier 14. If for any reason delivery of material is in excess of the tolerance weight limit, the voltage which is the electrical equivalent of the positive weight deviation permitted is insufficient to increase the preset signal from sections 11 and 12 above the level of the signal from the scale potentiometer 34. Consequently, amplifier 14 remains cut off and the sequencing means is held inoperative; for example, as shown in U.S. Patent 2,954,202.

In summary, the batch size transformer 21 energizes the material preset transformers 24 and 24' in proportion to the percentage of the total material to be delivered based on a predetermined basic batch size. The secondaries 26–28 and 26'–28' of sections 11 and 12 in turn are set to provide the desired weights for the basic or total batch size and as a result the energization of the batch size transformer 21 establishes a signal which is the electrical equivalent of the particular weights for the selected batch size and cause delivery of the related proportions to the hopper 7 in sequence.

The control unit 13 automatically establishes the over and under tolerance check by sequential insertion of the related potentiometers 44 and 45. The underweight tolerance potentiometer 44 is first inserted and if within tolerance, the overweight tolerance potentiometer is inserted in the illustrated embodiment. If the under or over tolerance check detects an erroneous delivery, an appropriate signal is provided to prevent further action.

The present invention in one aspect provides a quantity control means for batching processes wherein the tolerance control signal means is isolated from the output circuit of the delivery responsive circuitry. The present invention also provides control of a variable batch means in accordance with the actual batch size being mixed. In the embodiment of FIG. 1, the tolerance is also in accordance with the material quantity.

If desired, means can be provided for proportioning under and overweight tolerance percentages by batch size only with the over and under circuitry energized directly from the preset transformer; for example as shown in FIG. 2 which is a schematic circuit for delivery of a single material. Corresponding elements of FIGS. 1 and 2 are similarly numbered for simplicity and clarity of explanation.

The material selection transformer 24 is connected to be energized through a batch size transformer 21 and has its output connected to the control unit 13 to balance the condition established by the scale potentiometer 34, as in FIG. 1.

In FIG. 2, however, the over and under weight transformer secondary windings 42 and 43 are wound in common to the preset transformer 24 and are energized directly from the primary 25 and energize tolerance check potentiometers 44 and 45, with a correspondingly related polarity as shown by the polarity dots adjacent the ends of the several windings. In the embodiment of FIG. 2, the secondary windings 26–28 of the preset transformer 24 are connected in series and have the one side connected to the common line 22 in series with the underweight tolerance contacts 38 and overweight tolerance contacts 39.

The preset portion of the underweight tolerance potentiometer 44 is connected across the series connection of the contacts 38 and 39 with the tap 46 of the potentiometer connected in series with normally open contacts 49 to the connection to common line 22.

Assuming the illustrated relative polarities in the respective winding, when the contacts 38 open and the tap contacts 49 close, the under tolerance weight voltage is serially inserted in the circuit 180 degrees out of phase with the signal of windings 26–28 and reduces the signal to the control unit 13. This upsets the balance originally established as a result of the feed of material and provides a sensing of the tolerance relationship in the same manner as in FIG. 1. If the material is within the lower tolerance, the control unit removes potentiometer 44. Simultaneously, contacts 39 open and contacts 50 close to insert the overweight tolerance potentiometer 45. The polarity of the potentiometer 45 is the same as the secondary windings 26–28.

The potentiometer 45 has its tap 47 connected to the junction of contacts 38 and 39 and the high polarity side connected directly to the winding 26.

A signal level which is the weight equivalent of the upper tolerance is added to the preset signal. As in FIG. 1, the control unit 13 is actuated to the next sequence position only if the signal at lead 32 remains above the signal level established by the scale potentiometer tap 35.

In FIG. 2, the tolerance windings 42 and 43 are energized directly from the primary 25 and thus only in accordance with the batch size.

The present invention is particularly adapted to application in transformer selection systems but may also be applied to direct coupled systems employing alternating current or direct current. Further, the signal from the tolerance sources may be connected within the amplifier with the desired isolation provided within the amplifier.

Although shown in two preferred embodiments, the invention may be constructed in many other forms as defined in the accompanying claims. For example, the system of FIG. 1 and FIG. 2 can also be applied to each preset transformer of a control system to provide individual tolerance adjustment for each material. A single tolerance secondary as a separate unit or as a part of a material control transformer and potentiometer or potentiometers may also be with selective connection to provide the desired employed tolerance check.

The present invention provides a reliable and practical means to maintain quality control in batching processes such as concrete batching and the like.

Various modes of carrying out the invention are contemplated as being within the scope of the following claims particularly pointing out and distinctly claiming the subject matter which is regarded as the invention.

We claim:
1. An automatic weighing system for delivery of a preset quantity of material to a weighing means, comprising
   a power input means,
   a balance detecting control network including preset signal means for the quantity of material, and a receiving signal means for producing related signals in accordance with the weight of the material in the weighing means and a comparison circuit means having a first input means connected to the preset signal means and a second input means connected to the receiving signal means for summing said signals and producing an output signal for controlling said delivery and terminating delivery in response to establishment of a first balance output signal,
   a tolerance signal means establishing similar signals related to an electrical equivalent of a selected material tolerance,
   contact means connected in a circuit with the control network and the tolerance signal means and means to selectively actuate said contact means in response to establishment of the first balance output signal to insert said tolerance signal means in series to one of said input means in said comparison circuit means, and
   means connecting said power input means to the receiving signal means and connecting selective percentages of said power input means in accordance with a desired batch size to the preset signal means and to the tolerance signal means to directly establish tolerance control in accordance with the batch size.

2. The weighing system of claim 1 wherein said means connects the tolerance signal means to the output of the preset signal means to provide tolerance control in accordance with the batch size and the material quantity.

3. An automatic weighing system for delivery of a preset quantity of material, comprising
   a power input means,
   a balance detecting control network including a material preset transformer means and a material delivery signal means connected to said power input means and a comparison circuit means having an input means connected to said transformer means and said signal means to compare the output signals from each and to establish an output at an output means related to said comparison, said network including a batch size transformer means connected to said power line means and having an adjustable output means connected to energize said preset transformer means,
   a tolerance signal means including winding means en-energized from said batch size transformer means and adjustable means connected to said winding means to establish a signal which is an electrical equivalent of the selected material tolerance, and
   connecting contact means to selectively insert said tolerance signal means in the input means of said comparison circuit means and vary said output at said output means in accordance with the change in signal to the input means to determine if the material delivered is in excess of said selected material tolerance.

4. The weighing system of claim 3 wherein the winding means of the tolerance signal means forms a part of a separate transformer having a primary winding energized from the batch size transformer.

5. The weighing system of claim 3 wherein the winding means of the tolerance signal means forms a part of a separate transformer having a primary winding, and means connecting said primary winding in series with the output of the preset transformer means to provide tolerance signals in accordance with the batch size and the material quantity.

6. The weighing system of claim 3 wherein the winding means of the tolerance signal means is wound as a separate secondary winding means on the material preset transformer.

7. The weighing system of claim 1 wherein the winding means of the tolerance signal means includes a pair of windings wound as separate secondary windings on the material preset transformer, and potentiometer means connected one each to said pair of windings to provide an adjustably presettable output position.

8. The weighing system of claim 3 wherein the winding means of the tolerance signal means includes a pair of windings wound as separate secondary windings on the material preset transformer, potentiometer means connected one each to said pair of windings to provide an adjustably presettable output position, and said connecting means includes a pair of normally closed contacts connected in series with the output of the preset transformer, a set of normally open contacts connecting one potentiometer across one set of normally closed contracts, and a second set of normally open contacts connecting the second potentiometer across the second set of normally closed contacts.

9. The weighing system of claim 3 wherein the winding means of the tolerance signal means includes a pair of windings wound as separate secondary windings on the material preset transformer, said windings being wound to have similar instantaneous polarities, potentiometer means connected one each to said pair of windings, each of said potentiometers having a movable tap to provide an adjustably presettable output position, and the connecting means including contact means in series with the output of the material preset means to sequentially insert opposite portions of said potentiometers in the circuit means to shift the output signal in opposite directions.

10. The weighing system of claim 3 wherein the preset transformer means includes a plurality of transformers each having a primary connected to the batch size transformer means and an adjustable secondary connected to produce an adjustable output which is the electrical equivalent of the related material in a batch, and wherein the tolerance means includes a transformer having a primary winding connected in series with the secondaries of the preset transformers.

11. The weighing system of claim 10 wherein said tolerance means includes a first and a second secondary winding, the first winding providing an over tolerance check signal and the second winding providing an under tolerance check signal, a pair of corresponding potentiometers connected one each across said first and second secondary windings and each having a movable tap, and contact means connected in circuit with the potentiometer to insert a portion determined by the positioning of the taps in the comparison circuit means and including contacts normally bypassing said potentiometers.

References Cited

UNITED STATES PATENTS

| | | | |
|---|---|---|---|
| 3,106,974 | 10/1963 | Williams | 177—70 |
| 3,173,504 | 3/1965 | Thorsson et al. | 177—70 |
| 3,362,490 | 1/1968 | Maxwell | 177—70 |

RICHARD B. WILKINSON, Primary Examiner

G. H. MILLER, Jr., Assistant Examiner

U.S. Cl. X.R.

177—210